(12) United States Patent
Song

(10) Patent No.: US 10,996,796 B2
(45) Date of Patent: May 4, 2021

(54) TOUCH PANEL, ELECTRONIC DEVICE AND METHOD FOR GENERATING TOUCH INSTRUCTION THEREOF

(71) Applicants: BEIJING BOE DISPLAY TECHNOLOGY CO., LTD., Beijing (CN); BOE TECHNOLOGY GROUP CO., LTD., Beijing (CN)

(72) Inventor: Wenshuai Song, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 142 days.

(21) Appl. No.: 16/329,030

(22) PCT Filed: Aug. 8, 2018

(86) PCT No.: PCT/CN2018/099347
§ 371 (c)(1),
(2) Date: Feb. 27, 2019

(87) PCT Pub. No.: WO2019/076104
PCT Pub. Date: Apr. 25, 2019

(65) Prior Publication Data
US 2020/0356213 A1    Nov. 12, 2020

(30) Foreign Application Priority Data
Oct. 19, 2017   (CN) .......................... 201710979528.1

(51) Int. Cl.
G06F 3/042    (2006.01)
G02F 1/1333    (2006.01)
(Continued)

(52) U.S. Cl.
CPC ........ G06F 3/0421 (2013.01); G02F 1/13338 (2013.01); G02F 1/133512 (2013.01);
(Continued)

(58) Field of Classification Search
CPC ................. G06F 3/0421; G06F 3/0412; G02F 1/133514; G02F 1/13338; G02F 1/133528; G02F 1/133512
See application file for complete search history.

(56) References Cited

U.S. PATENT DOCUMENTS

2010/0271337 A1    10/2010  Noh et al.
2011/0080373 A1*    4/2011  Wang ...................... G06F 3/044
                                                              345/174

(Continued)

FOREIGN PATENT DOCUMENTS

| CN | 104750320 A | 7/2015 |
| CN | 107678603 A | 2/2018 |
| WO | 2013/105711 A1 | 7/2013 |

OTHER PUBLICATIONS

International Search Report and Written Opinion of the International Searching Authority (with English language translation of Written Opinion), International Application No. PCT/CN2018/099347, dated Nov. 12, 2018, 13 pp.

*Primary Examiner* — Mark W Regn
(74) *Attorney, Agent, or Firm* — Myers Bigel, P.A.

(57) ABSTRACT

The present disclosure provides a touch panel, an electronic device and a method for generating a touch instruction thereof. The touch panel includes a transparent film, a light-emitting layer and a photosensitive layer. The transparent film includes a first surface and a second surface facing with each other. A first thickness in a static status is between the first surface and the second surface. A second thickness in a pressed status under a pressure is between the first surface and the second surface, the second thickness is (Continued)

less than the first thickness. The light-emitting layer and the photosensitive layer are disposed at a side of the transparent film close to the second surface.

19 Claims, 4 Drawing Sheets

(51) Int. Cl.
  *G02F 1/1335* (2006.01)
  *G06F 3/041* (2006.01)
(52) U.S. Cl.
  CPC .. *G02F 1/133514* (2013.01); *G02F 1/133528* (2013.01); *G06F 3/0412* (2013.01)

(56) References Cited

U.S. PATENT DOCUMENTS

| 2015/0034811 | A1* | 2/2015 | David | G02B 6/264 |
| | | | | 250/227.11 |
| 2017/0301273 | A1* | 10/2017 | Atkinson | G06F 3/0421 |
| 2019/0107923 | A1* | 4/2019 | Drumm | G02B 6/42 |

* cited by examiner

TOUCH PANEL, ELECTRONIC DEVICE AND METHOD FOR GENERATING TOUCH INSTRUCTION THEREOF

CROSS REFERENCE TO RELATED APPLICATIONS

The present application is a 35 U.S.C. 371 national stage application of PCT International Application No. PCT/CN2018/099347, filed on Aug. 8, 2018, which claims the benefit of Chinese Patent Application No. 201710979528.1 filed on Oct. 19, 2017, the contents of which are incorporated herein by reference in their entireties.

TECHNICAL FIELD

The present disclosure relates to the field of touch technology, particularly to a touch panel, an electronic device and a method for generating a touch instruction thereof.

BACKGROUND

At present, capacitive touch screens are technology mainly used by touch screens, due to simple technique and long life time of products.

The basic working principle of the capacitive touch screens is to use a working way of transmitting and receiving of an electrical signal in which a driving electrical signal having a certain frequency and amplitude is transmitted by a transmitting end and is received by a receiving end. The receiving end detects a finger touch sensing signal and determines whether a touch occurs. In detecting the finger touch sensing signal, there is a need to form a coupling capacitance between a finger and a conductive layer of a capacitive touch screen when a hand presses the capacitive touch screen. If the hand wearing an isolator such as a glove presses the capacitive touch screen, the capacitive touch screen cannot be manipulated because a coupling capacitance cannot be established between the finger and the conductive layer.

SUMMARY

In the technology in which a capacitive touch screen is used as a touch panel, a finger is needed to establish a coupling capacitance with a conductive layer of the capacitive touch screen, and manipulation is bad. In view of this, the present disclosure provides a touch panel, an electronic device and a method for generating a touch instruction thereof.

In an aspect in accordance with the present disclosure, an embodiment of the present disclosure provides a touch panel comprising, a transparent film comprising a first surface and a second surface facing with each other, a first thickness in a static status being between the first surface and the second surface, a second thickness in a pressed status under a pressure being between the first surface and the second surface, the second thickness being less than the first thickness;

a light-emitting layer and a photosensitive layer disposed at a side of the transparent film close to the second surface.

In an embodiment, the touch panel can further comprise a touch instruction generating device. The touch instruction generating device can be electrically connected with the photosensitive layer and be configured to obtain an electrical signal generated by the photosensitive layer, compare a value of the electrical signal with a predefined threshold, and generate a touch instruction based on comparison.

In an embodiment, a difference between the first thickness and the second thickness can be larger than or equal to $\lambda/4$ wherein $\lambda$ is a wavelength of light emitted by the light-emitting layer.

In an embodiment, the first thickness is larger than $(2n+1)\lambda/4-\lambda/10$ and is less than $(2n+1)\lambda/4+\lambda/10$, n is a positive integer larger than or equal to 1. In another embodiment, the first thickness is larger than $n\lambda/2-\lambda/10$ and is less than $n\lambda/2+\lambda/10$, n is a positive integer larger than or equal to 1.

In an embodiment, the touch panel can further comprise a polarizing layer and a liquid crystal layer. In the embodiment, the polarizing layer, the transparent film, the liquid crystal layer and the light-emitting layer are arranged sequentially.

In an embodiment, the photosensitive layer is located between the transparent film and the liquid crystal layer. In another embodiment, the photosensitive layer is located between the liquid crystal layer and the light-emitting layer.

In an embodiment, the touch panel can further comprise a color filter. The color filter can comprise at least a red filtering unit, a green filtering unit, and a blue filtering unit. Light is able to pass through the red filtering unit, the green filtering unit, and the blue filtering unit, and is not able to pass through other regions of the color filter. The color filter is located below the photosensitive layer, or the photosensitive layer is manufactured between the adjacent filtering units of the color filter using a light-sensitive material.

In an embodiment, the color filter further comprises a black matrix, and the red filtering unit, the green filtering unit, and the blue filtering unit are located in open regions of the black matrix respectively.

In an embodiment, the light-emitting layer can comprise a backlight module.

In an embodiment, the light-emitting layer can comprise a pixel unit for imaging. The pixel unit comprises a red light-emitting region, a green light-emitting region, and a blue light-emitting region. In the embodiment, the photosensitive layer is manufactured by a light-sensitive material and is disposed in a region of the pixel unit other than the red light-emitting region, the green light-emitting region, and the blue light-emitting region.

In an embodiment, the transparent film can comprise at least one of a magnesium fluoride layer, a titanium oxide layer, a lead sulfide layer, a lead selenide layer and a vinyl-silsesquioxanes hybrid film.

In another aspect in accordance with the present disclosure, an embodiment of the present disclosure provides a method for generating a touch instruction of a touch panel. The method can comprise, obtaining an electrical signal generated by the photosensitive layer, after the light-emitting layer emits light toward the transparent film; and comparing a value of the electrical signal with a predefined threshold, and generating a touch instruction based on comparison.

In an embodiment, the first thickness is larger than $(2n+1)\lambda/4-\lambda/10$ and is less than $(2n+1)\lambda/4+\lambda/10$, n is a positive integer larger than or equal to 1. In this case, the generating the touch instruction based on comparison can comprise, if the value of the electrical signal is larger than or equal to the predefined threshold, generating the touch instruction.

In an embodiment, the first thickness is larger than $n\lambda/2-\lambda/10$ and is less than $n\lambda/2+\lambda/10$, n is a positive integer larger than or equal to 1. In this case, the generating the touch instruction based on comparison can comprise, if the value of the electrical signal is less than or equal to the predefined threshold, generating the touch instruction.

In an embodiment, the predefined threshold is a threshold which changes with an intensity of the light.

In an embodiment, the generating the touch instruction based on comparison can comprise, generating different touch instructions based on differences between values of the electrical signal and the predefined threshold.

In still another aspect in accordance with the present disclosure, an embodiment of the present disclosure provides an electronic device. The electronic device comprises the touch panel.

BRIEF DESCRIPTION OF THE DRAWINGS

Advantages and benefits will become clear to the ordinary skilled person in the art by reading the following detailed description of the implementations. The drawings are only used to illustrate the implementations and cannot be regarded as a limitation to the present disclosure. The same reference signs represent the same parts throughout the drawings in which.

DETAILED DESCRIPTION

Figure 1:
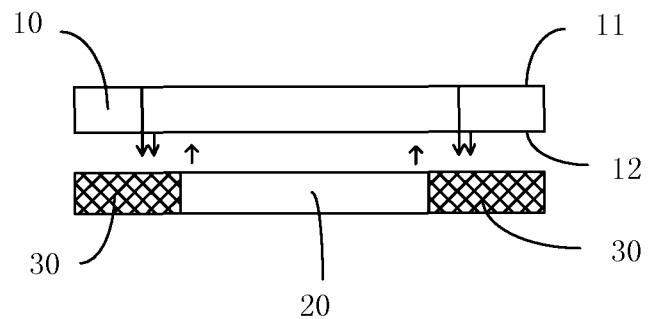
FIG. 1 is a schematic structure diagram of a touch panel provided by an embodiment of the present disclosure.

In the technical solutions provided by the embodiments of the present disclosure, a touch panel comprises a transparent film whose thickness can be changed by applying a pressure, and a light-emitting layer and a photosensitive layer disposed at a side of the transparent film. The light-emitting layer emits light toward the transparent film after it is turned on. A part of the emitted light is reflected after reaching a second surface of the transparent film, and another part of the emitted light is reflected after reaching a first surface of the transparent film. The light reflected by the first surface and the light reflected by the second surface are finally reflected to the photosensitive layer in a superposed way. In an unpressed static status of the transparent film, the light reflected by the first surface is reflected to the photosensitive layer in a first phase, the light reflected by the second surface is reflected to the photosensitive layer in a second phase, and the photosensitive layer can sense an intensity of light generated after the reflected light having the first phase and the reflected light having the second phase are superposed. In a pressed status in which the first surface of the transparent film is pressed, the first surface can approach the light-emitting layer and the light reflected by the first surface is changed to a third phase from the first phase. At this time, the photosensitive layer can sense an intensity of light generated after the reflected light having the second phase and the reflected light having the third phase are superposed. The light reflected by the first surface has different phases in the static status and the pressed status, and the light reflected by the second surface has the same phase in the two statuses. Therefore, in the two statuses, the intensities of light generated after the light reflected by the first surface and the light reflected by the second surface are superposed are different and the intensities of light sensible by the photosensitive layer are also different. Based on this, whether the transparent film is pressed can be determined by identifying the intensity of light sensed by the photosensitive layer. Compared with the capacitive touch screen in the related art, the touch panel in accordance with the present disclosure can implement a touch control without using a finger to establish an electrical connection with it, and manipulation is more convenient.

The above illustration is only an overview of the technical solutions of the present disclosure. In order to understand the technical means of the present disclosure more clearly and make them to be implemented in accordance with the content of the Description, specific implementations of the touch panel, the electronic device and the method for generating a touch instruction thereof provided in accordance with the present disclosure will be illustrated below in detail in combination with the drawings and the embodiments. In the following illustration, different phrases of "an embodiment" or "embodiments" do not necessarily refer to the same embodiment. Also, the specific features, structures or characteristics in one or more embodiments can be combined in any suitable form.

After the transparent film of the touch panel provided by the embodiment of the present disclosure is pressed, its thickness can decrease. The intensity of light generated after two beams of light reflected by the first surface and the second surface of the decreased transparent film are superposed is changeable relative to the intensity of light generated after two beams of light reflected by the first surface and the second surface of the unpressed transparent film are superposed. After the two superposed beams of light are reflected to the photosensitive layer, the photosensitive layer can sense change of the intensity of light, and thus, whether the touch panel is pressed can be determined by the intensity of light sensed by the photosensitive layer.

FIGS. 1 to 4 are a touch panel provided by an embodiment of the present disclosure. As shown in FIG. 1, the touch panel provided by the embodiment of the present disclosure can comprise a transparent film 10, a light-emitting layer 20 and a photosensitive layer 30.

Figure 7:
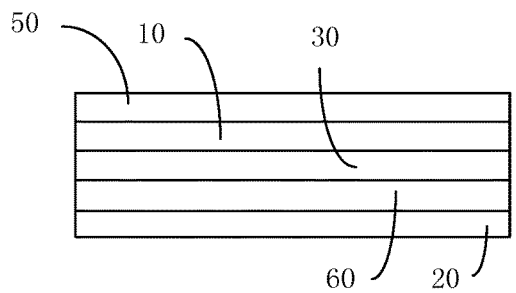
FIG. 7 is a schematic structure diagram of another touch panel provided by an embodiment of the present disclosure.

The transparent film 10 comprises a first surface 11 and a second surface 12 facing with each other. There is a first thickness in a static status between the first surface 11 and the second surface 12. If the transparent film 10 is in a natural status and any external pressure is not applied to the transparent film 10, the transparent film 10 is in the static status. In the static status, a thickness between the first surface 11 and the second surface 12 of the transparent film 10 is the first thickness. Also, there is a second thickness in a pressed status between the first surface 11 and the second surface 12. After an external pressure is applied to the transparent film 10, the transparent film 10 is in the pressed status. In the pressed status, a thickness between the first surface 11 and the second surface 12 of the transparent film is the second thickness, and the second thickness is less than the first thickness. The light-emitting layer 20 and the photosensitive layer 30 can be disposed at a side of the transparent film 10 close to the second surface 12. In an embodiment, as shown in FIG. 1, the light-emitting layer 20 and the photosensitive layer 30 are disposed in the same layer. In another embodiment, the light-emitting layer 20 and the photosensitive layer 30 can be disposed in different layers. For example, as shown in FIG. 7, the photosensitive layer 30 can be disposed on the light-emitting layer 20. That is, the photosensitive layer 30 is located between the transparent film 10 and the light-emitting layer 20.

Turning to FIG. 1, the light-emitting layer 20 can emit light to irradiate the transparent film 10. A part of light emitted by the light-emitting layer 20 is reflected after it irradiates the second surface 12, and another part of light emitted by the light-emitting layer 20 is reflected after it irradiates the first surface 11.

In this case, the photosensitive layer 30 senses only light reflected from the transparent film 10. The photosensitive layer 30 can sense two superposed beams of reflected light reflected by the first surface 11 and the second surface 12, and generate an electrical signal based on the sensed reflected light wherein a value of the electrical signal changes with the intensity of the two superposed beams of reflected light.

Figure 2:
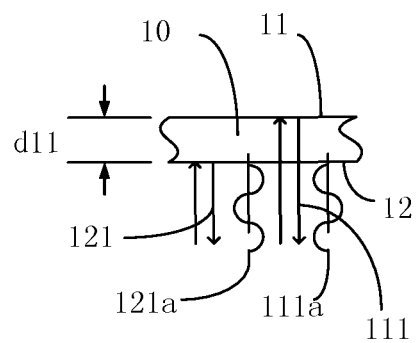
FIG. 2 is a schematic diagram of light reflection of a transparent film in a static status of a touch panel provided by an embodiment of the present disclosure.
Figure 3:
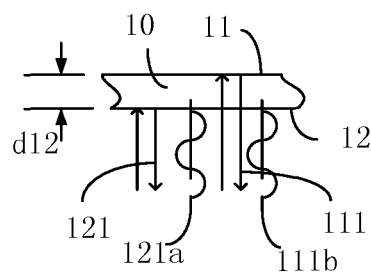
FIG. 3 is a schematic diagram of light reflection of a transparent film in a pressed status of a touch panel provided by an embodiment of the present disclosure.

The touch panel can comprise the transparent film 10 whose thickness can be changed by applying a pressure, and the light-emitting layer 20 and the photosensitive layer 30 disposed at a side of the transparent film. After the light-emitting layer 20 is turned on to emit light toward the transparent film 10, a part of the light is reflected after reaching the second surface 12, and another part of the light is reflected after reaching the first surface 11. After the light reflected by the first surface 11 and the light reflected by the second surface 12 are superposed, they are reflected to the photosensitive layer 30. As shown in FIG. 2, in the unpressed static status of the transparent film 10, the light 111 reflected by the first surface 11 is reflected to the photosensitive layer in a first phase 111a, the light 121 reflected by the second surface 12 is reflected to the photosensitive layer in a second phase 121a, and the photosensitive layer can sense an intensity of light generated after the reflected light 111 having the first phase 111a and the reflected light 121 having the second phase 121a are superposed. As shown in FIG. 3, in a pressed status in which the first surface 11 of the transparent film 10 is pressed, the first surface 11 can approach the light-emitting layer and the light 111 reflected by the first surface 11 is changed to a third phase 111b from the first phase. The photosensitive layer can sense an intensity of light generated after the reflected light 121 having the second phase 121a and the reflected light 111 having the third phase 111b are superposed. Since the phase of the light reflected by the first surface 11 is changed, the intensity of light generated after the reflected light 121 having the second phase 121a and the reflected light 111 having the third phase 111b are superposed is different from the intensity of light generated after the reflected light 111 having the first phase 111a and the reflected light 121 having the second phase 121a are superposed. The photosensitive layer can sense such a change of the intensity of light. Therefore, according to the present disclosure, whether the transparent film is pressed can be determined by identifying the intensity of light sensed by the photosensitive layer. Compared with the capacitive touch screen in the related art, the touch screen in accordance with the present disclosure can implement a touch control without using a finger to establish an electrical connection with it, and manipulation is more convenient.

As shown in FIG. 2, the light-emitting layer emits light having a wavelength of $\lambda$. In the unpressed static status of the transparent film 10, there is a first thickness d11 in the static status between the first surface and the second surface. The first thickness d11 is equal to $(2n+1)\lambda/4$, and n is a positive integer larger than or equal to 1. The reflected light 111 having the first phase 111a and the reflected light 121 having the second phase 121a interfere destructively, and the intensity of light sensed by the photosensitive layer is weak. Thus, a small electrical signal is generated. As shown in FIG. 3, in the pressed status in which the transparent film 10 is pressed, there is a second thickness d12 in the pressed status between the first surface and the second surface. In an embodiment, a difference between the second thickness d12 and the first thickness d11 can be equal to one fourth of the wavelength $\lambda$ of the light emitted by the light-emitting layer. That is, the difference between the first thickness and the second thickness is equal to $\lambda/4$ wherein $\lambda$ is the wavelength of the light emitted by the light-emitting layer. In this case, the reflected light 111 having the third phase 111b and the reflected light 121 having the second phase 121a interfere constructively, and the intensity of light sensed by the photosensitive layer is strong. Thus, a large electrical signal is generated. In the embodiment, when the transparent film is in the static status and in the pressed status respectively, the difference between intensities of light sensed by the photosensitive layer is especially apparent and the difference between the electrical signals generated by the photosensitive layer is large. In this case, it is easier to distinguish whether the transparent film is in the pressed status. It is understood that, in order to implement that the two beams of reflected light interfere constructively in the pressed status, the difference between the first thickness and the second thickness needs to be larger than or equal to $\lambda/4$. In practice, the first thickness is not limited to $(2n+1)\lambda/4$.

In an embodiment, the first thickness can be larger than $(2n+1)\lambda/4 - \lambda/10$ and be less than $(2n+1)\lambda/4 + \lambda/10$. That is, the first thickness can be between $(2n+1)\lambda/4 - \lambda/10$ and $(2n+1)\lambda/4 + \lambda/10$. In the case of that the first thickness meets such a condition, when the transparent film is in the unpressed static status, the intensity of light sensed by photosensitive layer is weak. As such, it can be beneficial for the photosensitive layer to more explicitly sense whether the transparent film is in the static status or in the pressed status.

Figure 4:
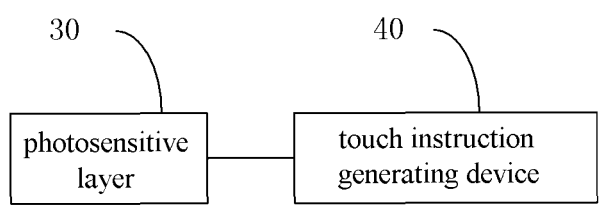
FIG. 4 is a schematic structure diagram of an electrical connection of a touch panel provided by an embodiment of the present disclosure.

As shown in FIG. 4, a touch instruction generating device 40 can be disposed on the touch panel. The touch instruction generating device 40 is electrically connected with the photosensitive layer 30, and is configured to obtain an electrical signal generated by the photosensitive layer 30, compare a value of the electrical signal with a predefined threshold, and generate a touch instruction based on comparison.

As described above, the first thickness can be larger than $(2n+1)\lambda/4-\lambda/10$ and be less than $(2n+1)\lambda/4+\lambda/10$. That is, the first thickness can be between $(2n+1)\lambda/4-\lambda/10$ and $(2n+1)\lambda/4+\lambda/10$. In the case of that the first thickness meets such a condition, when the transparent film is in the unpressed static status, the intensity of light sensed by photosensitive layer is weak and thus an electrical signal having a first intensity can be generated for example. When the transparent film is in the pressed status under a pressure, the intensity of light sensed by the photosensitive layer is strong and thus an electrical signal having a second intensity can be generated for example.

In an embodiment, the predefined threshold can be set as a value of the electrical signal having the second intensity. In this case, the generating the touch instruction based on comparison can comprise, if a value of an electrical signal is equal to the predefined threshold, generating a touch instruction. In another embodiment, the predefined threshold can be set as a value between a value of the electrical signal having the first intensity and a value of the electrical signal having the second intensity. In this case, the generating the touch instruction based on comparison can comprise, if a value of an electrical signal is larger than the predefined threshold, generating a touch instruction.

Figure 5:
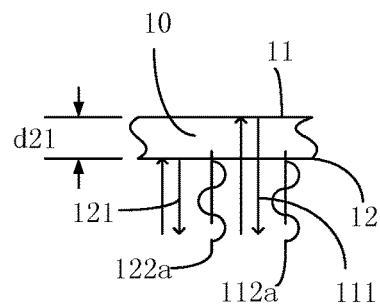
FIG. 5 is a schematic diagram of light reflection of a transparent film in a static status of another touch panel provided by an embodiment of the present disclosure.
Figure 6:
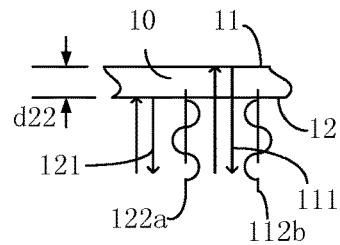
FIG. 6 is a schematic diagram of light reflection of a transparent film in a pressed status of another touch panel provided by an embodiment of the present disclosure.

In another embodiment provided by the present disclosure, a different thickness of the transparent film from that in the above embodiment can be selected. As shown in FIG. 5, the light-emitting layer also emits light having a wavelength of $\lambda$. However, in contrast with the transparent film as shown in FIG. 2, as shown in FIG. 5, when the transparent film 10 is in the uspressed static status, there is a first thickness d21 between the first surface 11 and the second surface 12 wherein the first thickness d21 is equal to $n\lambda/2$, and n is a positive integer larger than or equal to 1. In FIG. 5, when the transparent film 10 is in the unpressed static status, the reflected light 111 having the first phase 112a and the reflected light 121 having the second phase 122a interfere constructively, and the intensity of light sensed by the photosensitive layer is strong, thus generating a large electrical signal. As shown in FIG. 6, when the transparent film 10 is in the pressed status under a pressure, there is a second thickness d22 in the pressed status between the first surface 11 and the second surface 12, and a difference between the second thickness d22 and the first thickness d21 can be equal to one fourth of the wavelength $\lambda$ of the light emitted by the light-emitting layer. In this case, the reflected light 111 having the third phase 112b and the reflected light 121 having the second phase 122a interfere destructively, and the intensity of light sensed by the photosensitive layer is weak, thus generating a small electrical signal. In the embodiment, when the transparent film is in the static status and in the pressed status respectively, the difference between intensities of light sensed by the photosensitive layer is especially apparent and thus the difference between the electrical signals generated by the photosensitive layer is large. At this time, it is easier to distinguish whether the transparent film is in the pressed status. It is understood that, in order to implement that the two beams of reflected light interfere destructively in the pressed status, the difference between the first thickness and the second thickness needs to be larger than or equal to one fourth of the wavelength $\lambda$ of the light emitted by the light-emitting layer. In practice, the first thickness is not limited to $n\lambda/2$. In implementation, the first thickness can be larger than $n\lambda/2-\lambda/10$ and be less than $n\lambda/2+\lambda/10$. That is, the first thickness can be between $n\lambda/2-\lambda/10$ and $n\lambda/2+\lambda/10$. In this case, when the transparent film is in the unpressed static status, the intensity of light sensed by photosensitive layer is strong.

This embodiment differs from the above embodiments in that, when the transparent film is in the unpressed static status, the intensity of light sensed by photosensitive layer is strong, thus generating an electrical signal having a third intensity. When the transparent film is in the pressed status under a pressure, the intensity of light sensed by the photosensitive layer is weak, thus generating an electrical signal having a fourth intensity. In an embodiment, the predefined threshold as described above can be set as a value of the electrical signal having the fourth intensity. In this case, the generating the touch instruction based on comparison can comprise, if a value of an electrical signal is equal to the predefined threshold, generating a touch instruction. In another embodiment, the predefined threshold can be set as a value between a value of the electrical signal having the third intensity and a value of the electrical signal having the fourth intensity. In this case, the generating the touch instruction based on comparison can comprise, if a value of an electrical signal is less than the predefined threshold, generating a touch instruction.

In an embodiment in accordance with the present disclosure, a material which can be elastically deformed under a force can be used to manufacture the transparent film. For example, the transparent film can comprise a film manufactured using at least one of a magnesium fluoride layer material, a titanium oxide layer material, a lead sulfide layer material, a lead selenide layer material and a vinyl-silsesquioxanes hybrid film material, but is not limited to this.

Figure 8:
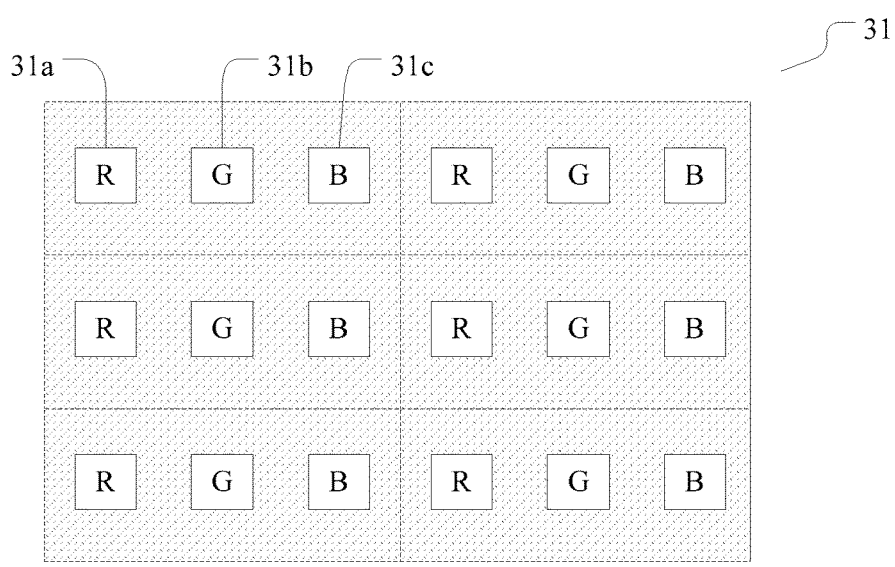
FIG. 8 is a schematic structure diagram of a color filter of a touch panel provided by an embodiment of the present disclosure.

The touch panel provided by the embodiment of the present disclosure can be applied to the Liquid Crystal Display (LCD). In this case, the touch panel can have a touch function and a display function at the same time. FIG. 7 and FIG. 8 are an embodiment of a touch panel provided by the present disclosure. As shown in FIG. 7, the touch panel provided by the embodiment of the present disclosure can comprise a transparent film 10, a light-emitting layer 20, a photosensitive layer 30, a polarizing layer 50 and a liquid crystal layer 60. As shown in FIG. 7, the polarizing layer 50, the transparent film 10, the liquid crystal layer 60 and the light-emitting layer 20 are arranged sequentially from top to bottom. The transparent film 10 is disposed between the polarizing layer 50 and the liquid crystal layer 60. The transparent film 10 is not influenced by change of the status of the liquid crystal layer 60, and thus can be irradiated by light generated by the light-emitting layer 20. In an embodiment, as shown in FIG. 7, the photosensitive layer 30 can be located between the transparent film 10 and the liquid crystal layer 60. In another embodiment, the photosensitive layer 30 can be also disposed between the liquid crystal layer 60 and the backlight module 20. When the photosensitive layer 30 is located between the transparent film 10 and the liquid crystal layer 60, the light reflected by the transparent film 10 can reach the photosensitive layer 30 in a short path, thus avoiding a light path through the liquid crystal layer. In the two cases, the photosensitive layer 30 can not only sense light directly emitted from the light-emitting layer 20, but also light reflected from the transparent film 10. Since the intensity of light directly emitted from the light-emitting layer 20 and sensed by the photosensitive layer 30 keeps unchanged in both of the static status and the pressed status of the transparent film 10, similar to the previous embodiments, the photosensitive layer 30 can also sense the change of the status of the transparent film 10.

In an embodiment, on the basis of the touch panel as shown in FIG. 7, the touch panel can also comprise a color filter 31 as shown in FIG. 8. The color filter 31 can comprise at least a red filtering unit 31a, a green filtering unit 31b, and a blue filtering unit 31c. The quantity of each of the red filtering unit 31a, the green filtering unit 31b, and the blue filtering unit 31c can be plural. Light can pass through the red filtering unit 31a, the green filtering unit 31b, and the blue filtering unit 31c, but cannot pass through other regions of the color filter 31. In an embodiment, the color filter 31 can be located directly below the photosensitive layer. In another embodiment, the color filter 31 can be located indirectly below the photosensitive layer. That is, the liquid crystal layer 60 is below the photosensitive layer 30, and the color filter 31 is below the liquid crystal layer 60. In the two cases, light emitted by the light-emitting layer 20 can reach the photosensitive layer only through the red filtering unit 31a, the green filtering unit 31b, and the blue filtering unit 31c, and other light can be shielded by other regions than the red filtering unit 31a, the green filtering unit 31b, and the blue filtering unit 31c of the color filter. Thus, regions of the photosensitive layer 30 corresponding to these regions can only receive light reflected from the transparent film 10, and regions of the photosensitive layer 30 corresponding to the red filtering unit 31a, the green filtering unit 31b, and the blue filtering unit 31c can simultaneously receive the light emitted from the light-emitting layer 20 and the light reflected from the transparent film 10. In still another embodiment, the photosensitive layer of the touch panel in accordance with the embodiment of the present disclosure can be manufactured between the adjacent filtering units of the color filter using a light-sensitive material. In this case, the whole photosensitive layer 30 can only receive the light reflected from the transparent film 10. In accordance with the present disclosure, the photosensitive layer is integrated on the color filter so as to conveniently assemble and produce. In an embodiment, the color filter 31 can also comprise a black matrix. The red filtering unit, the green filtering unit, and the blue filtering unit can be located in open regions of the black matrix respectively. The red filtering unit 31a, the green filtering unit 31b, and the blue filtering unit 31c as shown in FIG. 8 can be formed in the open regions of the black matrix for example. It is noted that, although the red filtering unit 31a, the green filtering unit 31b, and the blue filtering unit 31c are arranged in an array in FIG. 8, embodiments of the present disclosure are not limited to this and they can be arranged in other ways. In an embodiment, the photosensitive layer is located at a side of the black matrix away from the light-emitting layer, and an orthographic projection of the black matrix on the transparent film completely covers an orthographic projection of the photosensitive layer on the transparent film.

In the embodiment as shown in FIGS. 7 and 8, the light-emitting layer 20 can comprise a backlight module.

Figure 9:
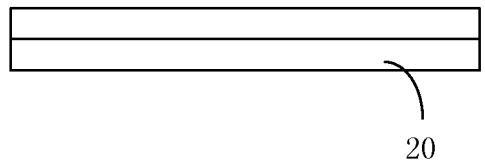
FIG. 9 is a schematic structure diagram of still another touch panel provided by an embodiment of the present disclosure.
Figure 10:
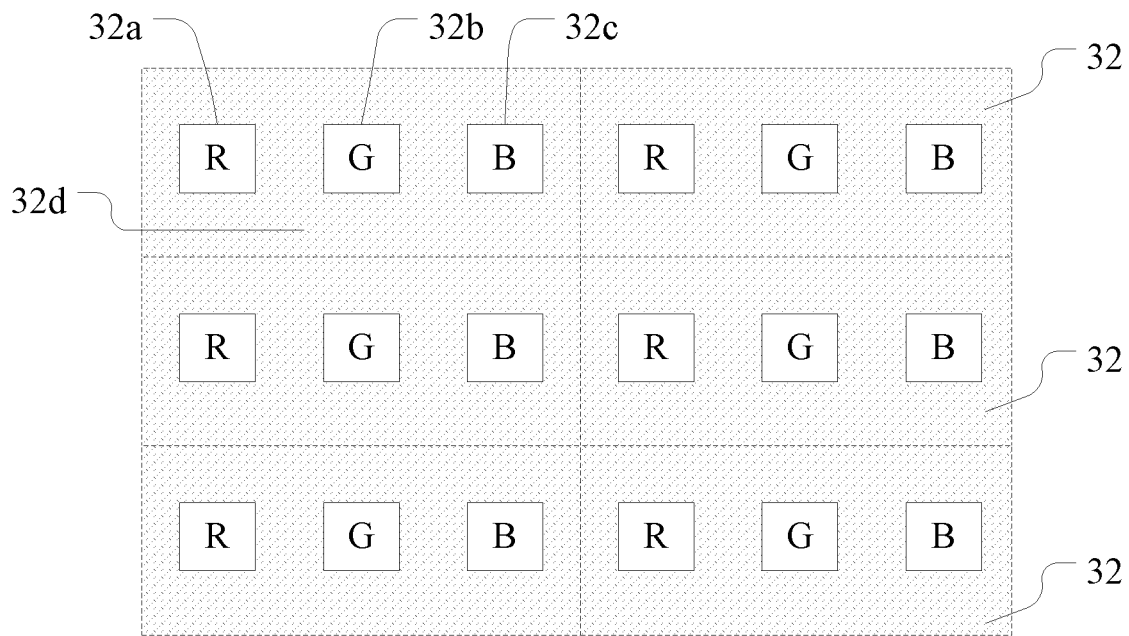
FIG. 10 is a schematic structure diagram of arrangement of a light-emitting layer and a photosensitive layer of a touch panel provided by an embodiment of the present disclosure.

The touch panel provided by the embodiment of the present disclosure can be applied to an Organic Light Emitting Display (OLED). In this case, the touch panel can have a touch function and a display function at the same time. FIGS. 9 and 10 are an embodiment of a touch panel provided by the present disclosure. As shown in FIGS. 9 and 10, a light-emitting layer of the touch panel provided by the embodiment of the present disclosure can comprise a pixel unit 32 for imaging. The pixel unit 32 can comprise a red light-emitting region 32a, a green light-emitting region 32b, and a blue light-emitting region 32c. The light-emitting layer can be manufactured by a light sensitive material and is disposed in a region 32d of the pixel unit 32 other than the red light-emitting region 32a, the green light-emitting region 32b, and the blue light-emitting region 32c so as to act as a photosensitive region. In this case, the whole photosensitive layer 30 (i.e. the region 32d) can only receive the light reflected from the transparent film 10.

An embodiment of the present disclosure can also provide an electronic device comprising the touch panel in the above embodiments.

The electronic device can be any product or component that has a touch function such as a display touch panel, an electronic paper, phone, a tablet computer, a TV, a display, a notebook computer, a digital photo frame, and navigator.

Compared with the electronic device using the capacitive touch screen in the related art, in touch control, the electronic device in accordance with embodiments of the present disclosure can implement a touch control without using a finger to establish an electrical connection with the touch panel, and manipulation is more convenient.

In accordance with an embodiment of the present disclosure, there is provided a method for generating a touch instruction of the touch panel provided in the above embodiments. In accordance with the present disclosure, after the transparent film of the touch panel is pressed, its thickness can decrease. the intensity of light generated after two beams of light reflected by the first surface and the second surface of the decreased transparent film are superposed is changeable relative to the intensity of light generated after two beams of light reflected by the first surface and the second surface of the unpressed transparent film are superposed. After the two superposed beams of light are reflected to the photosensitive layer, the photosensitive layer can sense such a change of the intensity of light. As such, in accordance with the present disclosure, whether the touch panel is pressed can be determined based on the intensity sensed by the photosensitive layer, thus controlling generation of the touch instruction.

Figure 11:
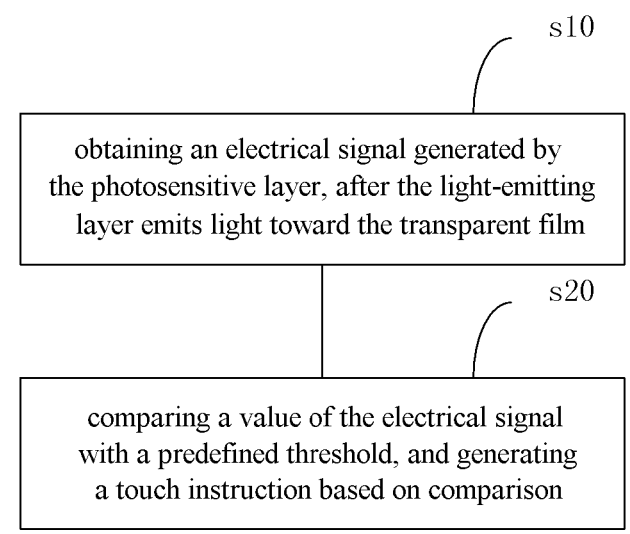
FIG. 11 is a schematic flowchart of a method for generating a touch instruction of a touch panel provided by an embodiment of the present disclosure.

FIG. 11 is a method for generating a touch instruction of the touch panel provided in an embodiment of the present disclosure. As shown in FIG. 11, the method can comprise, S10, obtaining an electrical signal generated by a photosensitive layer, after a light-emitting layer emits light toward a transparent film.

After the light-emitting layer emits the light, a part of the emitted light is reflected after reaching a second surface of the transparent film, and another part of the emitted light is reflected after reaching a first surface of the transparent film. The light reflected by the first surface and the light reflected by the second surface are reflected to the photosensitive layer in a superposed way. After the photosensitive layer is irradiated by the reflected light, the photosensitive layer generates an electrical signal corresponding to the intensity of the reflected light.

As shown in FIG. 11, the method can further comprise, S20, comparing a value of the electrical signal with a predefined threshold and generating a touch instruction based on comparison.

The predefined threshold is generally a parameter computed based on the intensity of the light emitted by the light-emitting layer. Light-emitting layers having different light-emitting intensities can be corresponding to different predefined thresholds.

Figure 12:
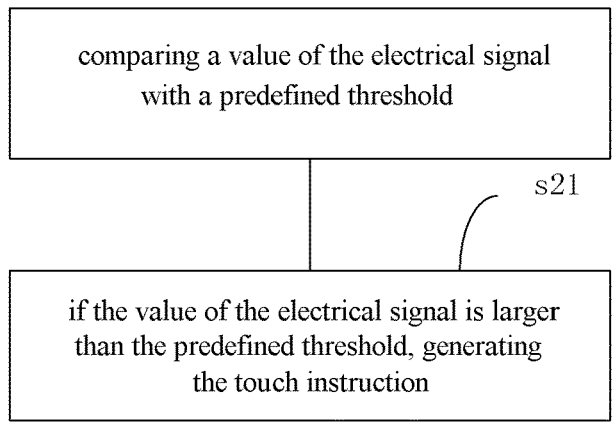
FIG. 12 is an embodiment of step S20 of the method for generating the touch instruction of the touch panel in FIG. 11.

In an embodiment, as described above, the first thickness of the transparent film can be larger than $(2n+1)\lambda/4-\lambda/10$ and be less than $(2n+1)\lambda/4+\lambda/10$. That is, the first thickness can be between $(2n+1)\lambda/4-\lambda/10$ and $(2n+1)\lambda/4+\lambda/10$. In the embodiment, when the transparent film is in the unpressed static status, the two beams of reflected light interfere destructively. At this time, the intensity of light sensed by photosensitive layer is weak and an electrical signal which has a first intensity corresponding to the weak intensity of light is generated. After the transparent film is pressed, the transparent film becomes thin, and the two beams of reflected light can change from destructive interference to constructive interference. At this time, the intensity of light sensed by the photosensitive layer is strong and an electrical signal which has a second intensity corresponding to the strong intensity of light is generated. In this case, the predefined threshold can be set as a value of the electrical signal having the second intensity. At this time, the generating the touch instruction based on comparison in the step of S20 can comprise, if a value of an electrical signal is equal to the predefined threshold, generating a touch instruction. Also, the predefined threshold can also be set as a value between a value of the electrical signal having the first intensity and a value of the electrical signal having the second intensity. In this case, as shown in FIG. 12, the generating the touch instruction based on comparison in the step of S20 can comprise, S21, if a value of an electrical signal is larger than the predefined threshold, generating a touch instruction.

Figure 13:
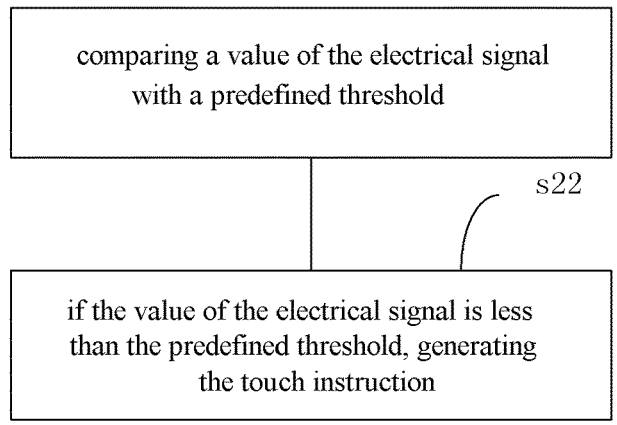
FIG. 13 is another embodiment of step S20 of the method for generating the touch instruction of the touch panel in FIG. 11.

In an embodiment, the first thickness of the transparent film can be larger than $n\lambda/2-\lambda/10$ and be less than $n\lambda/2+\lambda/10$. That is, the first thickness can be between $n\lambda/2-\lambda/10$ and $n\lambda/2+\lambda/10$. In the embodiment, when the transparent film is in the unpressed static status, the two beams of reflected light interfere constructively. At this time, the intensity of light sensed by photosensitive layer is strong and an electrical signal which has a third intensity corresponding to the strong intensity of light is generated. After the transparent film is pressed, the transparent film becomes thin, and the two beams of reflected light can change from constructive interference to destructive interference. The intensity of light sensed by the photosensitive layer is weak and an electrical signal which has a fourth intensity corresponding to the strong intensity of light is generated. In this case, the predefined threshold can be set as a value of the electrical signal having the fourth intensity. At this time, the generating the touch instruction based on comparison in the step of S20 can comprise, if a value of an electrical signal is equal to the predefined threshold, generating a touch instruction. Also, the predefined threshold can be set as a value between a value of the electrical signal having the third intensity and a value of the electrical signal having the fourth intensity. In this case, as shown in FIG. 13, the generating the touch instruction based on comparison in the step of S20 can comprise, S22, if a value of an electrical signal is less than the predefined threshold, generating a touch instruction.

When the touch panel is applied to a display component, the light-emitting layer can be a light-emitting element located on a display surface of the display component. The light-emitting intensity of the light-emitting layer is generally adjustable so that the light-emitting intensity of the light-emitting layer is changeable in operation. In this case, the predefined threshold can be a threshold which changes with the light intensity of the light-emitting layer. As such, after the light intensity of the light-emitting layer changes, the touch function can still be implemented. For example, the predefined threshold can be a threshold which increases with the increasing light intensity of the light-emitting layer, or a threshold which decreases with the decreasing light intensity of the light-emitting layer.

In the step of S20, after the touch panel is pressed, the outputted touch instruction can be one touch instruction. But the present disclosure is not limited to this. In an embodiment provided according to the present disclosure, the touch panel can generate a touch instruction corresponding to the pressure. For example, after different degrees of pressures are applied to the touch panel, the method for generating the touch instruction of the touch panel provided according to the embodiment of the present disclosure can generate at least two touch instructions.

Figure 14:
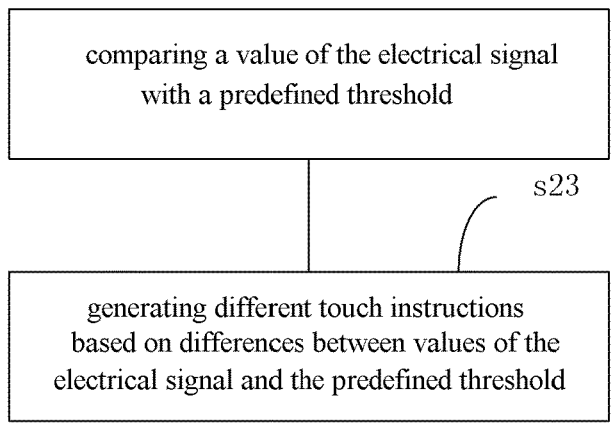
FIG. 14 is still another embodiment of step S20 of the method for generating the touch instruction of the touch panel in FIG. 11.

In an embodiment, as shown in FIG. 14, the generating the touch instruction based on comparison can comprise, S23, generating different touch instructions based on differences between values of an electrical signal and the predefined threshold.

In an embodiment, When the first thickness of the transparent film is larger than $(2n+1)\lambda/4-\lambda/10$ and is less than $(2n+1)\lambda/4+\lambda/10$, i.e., the first thickness is between $(2n+1)\lambda/4-\lambda/10$ and $(2n+1)\lambda/4+\lambda/10$, if an increasing pressure is applied to the touch panel, the two beams of reflected light changes from destructive interference to constructive interference and at the same time, the generated electrical signal can also change from weak to strong, thus possibly resulting in change of the difference between the value of the electrical signal and the predefined threshold. In an embodiment, when the first thickness of the transparent film is larger than $n\lambda/2-\lambda/10$ and is less than $n\lambda/2+\lambda/10$, i.e., the first thickness is between $n\lambda/2-\lambda/10$ and $n\lambda/2+\lambda/10$, if an increasing pressure is applied to the touch panel, the two beams of reflected light changes from constructive interference to destructive interference, and at the same time, the generated electrical signal can also change from strong to weak, thus resulting in change of the difference between the value of the electrical signal and the predefined threshold. Based on such a principle, the difference can be set to generate a touch instruction corresponding to the difference. For example, differences can be classified into multiple intervals, and each interval corresponds to one touch instruction.

In accordance with the embodiment of the present disclosure, different touch instructions are generated by detecting differences between values of an electrical signal and a predefined threshold. This can implement a function in which different control instructions are generated based on different degrees of pressures applied by a user.

In the above embodiments, the embodiments are described in different focuses. A part which is not described in a certain embodiment can make reference to related description of other embodiments.

It would be understood that related features in the above apparatuses can be referred to each other. Also, "first", "second", etc. in the above embodiments are used for distinguishing the embodiments, and do not represent advantages and disadvantages of the embodiments.

The description provided herein illustrates a lot of specific details. However, it would be understood that, the embodiments of the present disclosure can be practiced without these specific details. In some examples, the well-known structures and technologies are not shown in detail so as to not obscure understanding of the description.

Similarly, it would be understood that, in order to simplify the present disclosure and help to understand one or more of the disclosed aspects, in the above description of the exemplified embodiments of the present disclosure, the features of the present disclosure are grouped together into a single embodiment, figure or description thereof sometimes. However, the disclosed apparatus cannot be construed as indicating an intent that the claimed disclosure claims more features than those definitely recited in each claim. Or rather, as indicated in the attached claims, the disclosed aspects lie in comprising features less than all features in a single embodiment as disclosed above. Therefore, the claims following the detailed description are explicitly incorporated into the detailed description wherein each claim itself acts as an independent embodiment of the present disclosure.

It would be understood by the skilled person in the art that, components of an apparatus of an embodiment can be changed adaptively and disposed into one or more apparatuses different from that of the embodiment. The components of the embodiment can be combined into one component, and can also be divided into multiple subcomponents. unless that at least some of these features are mutually exclusive, all features disclosed in the description (including the accompanying claims, the abstract and the drawings) and all components of any apparatus disclosed as such can be combined in any combination. Unless specifically stated, each feature disclosed in the description (including the accompanying claims, the abstract and the drawings) can be replaced with a substituted feature providing a same, an identical or similar object.

Also, it would be understood by the skilled person in the art that, although some embodiments described herein comprise certain features included in other embodiments rather than other features, a combination of features in different embodiments means being within the scope of the present disclosure and forming a different embodiment. For example, in the attached claims, any one of the claimed embodiments can be used in any combination. Embodiments of components of the present disclosure can be implemented in hardware or combination thereof.

It is noted that, the above embodiments illustrate and don't limit the present disclosure. The skilled person in the art can design substituted embodiments without departing from the scope of the attached claims. In the claims, any reference sign in parentheses cannot be construed as a limitation to the claims. Word "comprising" does not exclude presence of components or parts other than those listed in the claims. Word "a" or "an" prior to a component or part does not exclude presence of a plurality of the components or parts. The present disclosure can be implemented by means of an apparatus including several different components. In a claim enumerating several components, several of the components can be embodied by one component item. Use of word "first", "second" and so on does not represent any order. These words can be explained as names.

The above is only preferred implementations of the present disclosure and is not a limitation to the present disclosure in any form. Any simple modifications, identical alternations and decorations made to the above embodiments based on the technical nature of the present disclosure still fall in the scope of the technical solutions of the present disclosure.

The invention claimed is:

1. A touch panel comprising:
  a transparent film comprising a first surface and a second surface facing each other, wherein a first thickness of the transparent film is in a static status between the first surface and the second surface, wherein a second thickness of the transparent film is in a pressed status under a pressure between the first surface and the second surface, and wherein the second thickness is less than the first thickness;
  a light-emitting layer and a photosensitive layer at a side of the transparent film close to the second surface, wherein the light-emitting layer is configured to emit light to irradiate the transparent film, wherein a part of light emitted by the light-emitting layer is reflected after it irradiates the second surface, and another part of light emitted by the light-emitting layer is reflected after it irradiates the first surface, and wherein the photosensitive layer is configured to sense two superposed beams of reflected light reflected by the first surface and the second surface, and generate an electrical signal based on the two superposed beams of reflected light; and
  a touch instruction generating device electrically connected to the photosensitive layer and configured to obtain an electrical signal generated by the photosensitive layer, compare a value of the electrical signal with a predefined threshold, and generate a touch instruction based on comparison of the value of the electrical signal with the predefined threshold.

2. The touch panel according to claim 1,
  wherein a difference between the first thickness and the second thickness is greater than or equal to $\lambda/4$, and
  wherein $\lambda$ is a wavelength of light emitted by the light-emitting layer.

3. The touch panel according to claim 2,
  wherein the first thickness is greater than $(2n+1)\lambda/4-\lambda/10$ and is less than $(2n+1)\lambda/4+\lambda/10$, and n is a positive integer greater than or equal to 1,
  or the first thickness is greater than $n\lambda/2-\lambda/10$ and is less than $n\lambda/2+\lambda/10$, and n is a positive integer greater than or equal to 1.

4. The touch panel according to claim 1, further comprising:
  a polarizing layer; and
  a liquid crystal layer,
  wherein the polarizing layer, the transparent film, the liquid crystal layer and the light-emitting layer are arranged sequentially from top to bottom in the touch panel.

5. The touch panel according to claim 4,
  wherein the photosensitive layer is between the transparent film and the liquid crystal layer, or the photosensitive layer is between the liquid crystal layer and the light-emitting layer.

6. The touch panel according to claim 4, further comprising:
  a color filter;
  wherein, the color filter comprises at least a red filtering unit, a green filtering unit, and a blue filtering unit,
  wherein light is able to pass through the red filtering unit, the green filtering unit, and the blue filtering unit, and is not able to pass through other regions of the color filter, and
  wherein the color filter is below the photosensitive layer, or the photosensitive layer is between the adjacent filtering units of the color filter using a light-sensitive material.

7. The touch panel according to claim 6, wherein the color filter further comprises:
  a black matrix,
  wherein the red filtering unit, the green filtering unit, and the blue filtering unit are in open regions of the black matrix.

8. The touch panel according to claim 4, wherein the light-emitting layer comprises a backlight module.

9. The touch panel according to claim 1,
  wherein, the light-emitting layer comprises a pixel unit for imaging, wherein the pixel unit comprises a red light-emitting region, a green light-emitting region, and a blue light-emitting region, and wherein the photosensitive layer comprises a light-sensitive material and is in a region of the pixel unit other than the red light-emitting region, the green light-emitting region, and the blue light-emitting region.

10. The touch panel according to claim 1,
wherein the transparent film comprises at least one of a magnesium fluoride layer, a titanium oxide layer, a lead sulfide layer, a lead selenide layer or a vinyl-silsesquioxanes hybrid film.

11. A method for generating a touch instruction of the touch panel according to claim 1, the method comprising;
obtaining an electrical signal generated by the photosensitive layer, after the light-emitting layer emits light toward the transparent film;
comparing a value of the electrical signal with a predefined threshold; and
generating a touch instruction based on the comparing the value of the electrical signal with the predefined threshold.

12. The method for generating the touch instruction according to claim 11,
wherein, the first thickness is greater than $(2n+1)\lambda/4-\lambda/10$ and is less than $(2n+1)\lambda/4+\lambda/10$, and n is a positive integer greater than or equal to 1; and
wherein the generating the touch instruction based on the comparing comprises, if the value of the electrical signal is greater than or equal to the predefined threshold, generating the touch instruction.

13. The method for generating the touch instruction according to claim 11,
wherein, the first thickness is greater than $n\lambda/2-\lambda/10$ and is less than $n\lambda/2+\lambda/10$, and n is a positive integer greater than or equal to 1; and
wherein the generating the touch instruction based on the comparing comprises, if the value of the electrical signal is less than or equal to the predefined threshold, generating the touch instruction.

14. The method for generating the touch instruction according to claim 11,
wherein the predefined threshold comprises a threshold which changes with an intensity of the light.

15. The method for generating the touch instruction according to claim 11,
wherein the generating the touch instruction based on the comparing comprises, generating different touch instructions based on differences between values of the electrical signal and the predefined threshold.

16. An electronic device comprising the touch panel according to claim 1.

17. The electronic device according to claim 16, wherein the touch panel further comprises:
a polarizing layer; and
a liquid crystal layer,
wherein the polarizing layer, the transparent film, the liquid crystal layer and the light-emitting layer are arranged sequentially from top to bottom in the touch panel.

18. The electronic device according to claim 16, wherein the touch panel further comprises:
a color filter,
wherein the color filter comprises at least a red filtering unit, a green filtering unit, and a blue filtering unit,
wherein light is able to pass through the red filtering unit, the green filtering unit, and the blue filtering unit, and is not able to pass through other regions of the color filter, and
wherein the color filter is below the photosensitive layer, or the photosensitive layer is between the adjacent filtering units of the color filter using a light-sensitive material.

19. The electronic device according to claim 16, wherein the light-emitting layer comprises:
a pixel unit for imaging,
wherein the pixel unit comprises a red light-emitting region, a green light-emitting region, and a blue light-emitting region; and
wherein the photosensitive layer comprises a light-sensitive material and is in a region of the pixel unit other than the red light-emitting region, the green light-emitting region, and the blue light-emitting region.

* * * * *